United States Patent [19]

Sagoi et al.

[11] Patent Number: 4,701,374
[45] Date of Patent: Oct. 20, 1987

[54] MAGNETIC RECORDING MEDIUM

[75] Inventors: Masayuki Sagoi; Yoichiro Tanaka; Hiroki Nakamura, all of Kanagawa, Japan

[73] Assignee: Kabushiki Kaisha Toshiba, Kawasaki, Japan

[21] Appl. No.: 750,270

[22] Filed: Jul. 1, 1985

[30] Foreign Application Priority Data

Nov. 30, 1984 [JP] Japan .............................. 59-253055
Nov. 30, 1984 [JP] Japan .............................. 59-253058

[51] Int. Cl.$^4$ .......................... G11B 5/64; G11B 5/72
[52] U.S. Cl. .................................... 428/336; 427/131; 428/694; 428/695; 428/698; 428/900
[58] Field of Search ............. 428/694, 695, 900, 332, 428/698, 336; 427/131

[56] References Cited

U.S. PATENT DOCUMENTS 4,187,344 2/1980 Fredriksson .................. 428/698
4,411,963 10/1983 Aine .............................. 427/131
4,529,659 7/1985 Hoshino et al. ................ 427/131
4,565,734 1/1986 Arai et al. ...................... 427/131

FOREIGN PATENT DOCUMENTS 0113416 7/1982 Japan .............................. 428/694

Primary Examiner—Paul J. Thibodeau
Attorney, Agent, or Firm—Cushman, Darby & Cushman

[57] ABSTRACT

A magnetic recording medium obtained by forming a Si-N-O system film on a magnetic recording layer with perpendicular axis of easy magnetization. The magnetic recording layer is a metallic magnetic film such as Co-Cr system alloy film. The oxygen content in the Si-N-O system film is selected preferably to show a maximum absorption of infrared radiation in the range above 830 cm$^{-1}$ and below 1100 cm$^{-1}$ of $1/\lambda$ ($\lambda$ is the wavelength of the infrared radiation). Through formation of the Si-N-O system film, the magnetic recording medium can satisfy simultaneously both of the durability and the perpendicular magnetic recording characteristics.

10 Claims, 3 Drawing Figures

MAGNETIC RECORDING MEDIUM

BACKGROUND OF THE INVENTION

The present invention relates to a magnetic recording medium, and more particularly to a perpendicular magnetic recording medium which includes a magnetic recording layer having an axis of easy magnetization in the direction essentially perpendicular to its own layer surface.

With advancements in information processing techniques, the quantity of information handled by memory devices has increased rapidly in recent years. There is a corresponding increased demand for greater data storage capacity in magnetic recording media such as floppy disks. In response to this demand, active research and development have been pursued on magnetic recording media with high density capability, in particular on perpendicular recording media which realize magnetic data storage by generating residual magnetism in the direction essentially perpendicular to the layer surface. The magnetic recording layer has a perpendicular axis of easy magnetization in a direction essentially perpendicular to the layer surface of its own.

As such a magnetic recording layer, there is known a metallic film type medium formed by sputtering or vapor deposition of a metallic film such as a Co-Cr system alloy or the like, or an oxide film type medium having a magnetioplumbite type crystal structure as Ba ferrite or Sr ferrite. Such a perpendicular magnetic recording medium is considered to be promising as a medium more suitable for high density recording than a spreading type medium that is used for the majority of the longitudinal magnetic recording media.

In a spreading type medium, the magnetic recording medium is formed by spreading magnetic powder on a base by mixing it with a binder or the like. Therefore, the magnetic recording layer formed is elastic, and in addition, it is possible to mix a lubricant in the magnetic layer. This leads to maintaining a satisfactory contact between the magnetic medium and the magnetic head, making it possible to give a sufficient durability to the medium and the head.

In contrast to this, a magnetic recording layer of the metallic film type medium or the oxide film type medium has little elasticity so that, when a magnetic head made of a hard material such as ferrite runs on a magnetic medium, damages such as scratches tend to be created on the surface of the medium or the head. In that case, not only the durability of the medium and the head is injured, but also the effective spacing between the medium and the head is increased due to adherence of the powder abraded from the medium or the head. This results in an increase in the spacing loss which causes degradation in the frequency characteristic and lowering and variations in output power during the reproducing (reading from the disk).

For this reason, it is considered, in the case of the metallic film type and the oxide film type medium, to form a protective layer made of a hard material over the magnetic recording medium in order to protect it. As a concrete example of the protective layer, there has been proposed a film of silicon oxide, aluminum oxide, titanium nitride, and others. However, the quality of material of such a protective layer is brittle so that it tends to be worn out by its contact with the magnetic head. Then, the resulting worn powder damages the medium and the head, showing that it will not be sufficient as a solution to the above problem.

Forming the protective layer thick enough to be effecting for preventing abrasion of the magnetic recording layer, would make it undesirable from the viewpoint of the perpendicular magnetic recording characteristic. Namely, the recording density of the perpendicular magnetic recording system is essentially much higher than that of the longitudinal magnetic recording system, and permits the recording wavelength to be reduced. However, in order to accomplish these it becomes necessary to restrict the effective spacing between the head and the medium to an extremely small value, and accordingly, the thickness of the protective layer is limited also. When the thickness of the protective layer is restricted in this way to the extent that it does not injure the perpendicular magnetic recording characteristic, the effects on the improvement in the durability of the layer may not be expected too much.

On the other hand, as an alternative there may be considered a method of spreading a lubricant over the magnetic recording layer. However, in the case of a metallic film type medium, the film formed by sputtering or a like method has such a smooth surface that the wetting and holding power for a lubricant are low. Therefore, it is difficult to spread a lubricant over the layer with sufficient adhesive power and uniformity so that the above problem still remains unsolved.

SUMMARY OF THE INVENTION

An object of the present invention is to provide a magnetic recording medium which is capable of remarkably improving the durability of a medium itself and a magnetic head that runs by making contact with the medium.

Another object of the present invention is to provide a magnetic recording medium which is capable of reducing the spacing loss between the magnetic recording medium and the magnetic head, and by means of that, improving the frequency characteristic as well as improving remarkably the perpendicular magnetic recording characteristic, such as reducing the lowering and the variations in the output power during the reproducing.

According to a preferred embodiment of the present invention, the magnetic recording medium includes a nonmagnetic base, a magnetic recording layer, formed on the base, which has an axis of easy magnetization in a direction approximately perpendicular to its own layer surface, and on top of it, a film which contains silicon (Si), nitrogen (N), and oxygen (O) (later referred to as a Si-N-O system film) formed as a protective layer. The oxygen content in the protective layer is selected so as to let the protective layer show a maximum of infrared absorption in the range between 830 cm$^{-1}$ and 1100 cm$^{-1}$ of $1/\lambda$ ($\lambda$ is the wavelength of the infrared radiation). In addition, it is preferable to form a lubricant layer over the protective layer.

A magnetic recording medium of the present invention formed in this fashion shows an excellent durability and magnetic recording characteristics.

BRIEF DESCRIPTION OF THE DRAWINGS

These and other objects and advantages of this invention will become more apparent and more readily appreciated from the following detailed description of the presently preferred exemplary embodiments of the invention with reference to the accompanying drawings, in which.

DETAILED DESCRIPTION OF THE PREFERRED EMBODIMENTS

Figure 1:
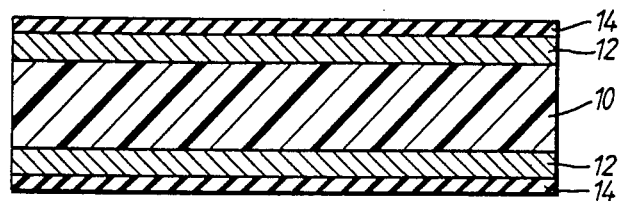
FIG. 1 illustrates the sectional view of an embodiment of the present invention.

In FIG. 1, base 10 is a film-form base (substitute) made of resin, and on each of the surfaces of the base 10 there is formed a Co-Cr system alloy film 12 with thickness of 0.5–1.0 μm by dc magnetron sputtering, as a magnetic recording layer. The Co-Cr system alloy film 12 is oriented so as to have an axis of easy magnetization in the direction perpendicular to the film surface. That is, the Co-Cr system alloy film 12 has a perpendicular magnetic anisotropy. In addition, on the Co-Cr system alloy film 12 there is formed a Si-N-O system film 14 with thickness between 20 Å and 500 Å, preferably between 50 A and 400 Å, as a protective layer.

The Si-N-O system film 14 is formed, for example, by high frequency sputtering using silicon nitride as a target. In this case, sputtering was carried out by introducing argon gas an oxygen gas to about $10^{-2}$ Torr, after pumping in advance the vacuum chamber for sputtering to about $10^{-7}$ Torr to remove thoroughly remaining impurity gases. It should be noted that the Si-N-O system film 14 may also be formed by reactive sputtering with silicon target. The composition of silicon, nitrogen, oxygen, and other impurities in the Si-N-O system film 14 is controlled by the speed of film formation, partial pressure of oxygen in the sputtering gas pressure, and others.

The Si-N-O system film thus formed is very hard with Vickers hardness of about 1400 kg/m$^2$ so that it can positively protect the magnetic recording layer from damages that may be caused due to its contact with the magnetic head. Moreover, the abrasion-resistance of a Si-N-O system film is superior to the film of silicon oxide, aluminum oxide, titanium nitride, or the like. Therefore, even with a continuous running of the magnetic head over the Si-N-O system film, the amount of abraded powder generated is very small such that the abrasion and damage to the medium itself and the head can be reduced markedly. Further, since the Si-N-O system film is extremely fine as a material, it has an effect to isolate the magnetic recording layer from the surrounding atmosphere and conspicuously increases the abrasion-resistance of the recording layer. This effect is more striking especially when the Si-N-O system film is amorphous. Combined with special features that it has satisfactory abrasion-resistance and corrosion-resistance mentioned above, the Si-N-O system film can improve the durability of the medium and the magnetic head even if its thickness is relatively small. For this reason, together with the fact that the generation of the abraded powder is small, and that the increase in the effective spacing between the medium and head is small, as mentioned above, the spacing loss between the medium and the head can be made small. This leads to an improvement in the frequency characteristic as well as to a reduction in the lowering and the variations in the output power during the reproducing, making it possible to improve the perpendicular magnetic recording characteristics to a remarkable extent. That is, it becomes possible to provide a magnetic recording medium which satisfies simultaneously both of the durability and the perpendiculr magnetic recording characteristics.

Furthermore, the Si-N-O system film is manufactured with a high degree of repeatability that is, films separately manufactured tend to have the same quality.

The thickness of the Si-N-O system film is determined based on the trade-off between the durability and the perpendicular magnetic recording characteristics. It has been found, as mentioned earlier, that a satisfactory durability and the perpendicular magnetic recording characteristics are obtainable for a film thickness in the range between 20 Å and 500 Å, preferably between 50 Å and 400 Å.

Tables 1 and 2 show the results of experiment on the durability of the magnetic recording medium obtained by forming various protective layers on the Co-Cr system alloy film by high frequency sputtering. The experiment was by forming the magnetic recording media with the above construction into the shape of floppy disks and contacting a ferrite magnetic head to an identical track on the disks while the disks were turned at the speed of 300 rotations per minute. Here, the durability is defined as the number of turns (passes) of the disk before at least one of the medium (disk) or the head suffers a conspicuous damage. What is meant by a conspicuous damage here for the case of the medium is a state in which at least a portion of the protective layer and the recording layer is scraped to an extent to expose the surface of the base. Examined in Table 1 is the durability of the Si-N-O system films with various compositions as protective layers. The ratios of silicon, nitrogen, and oxygen in a Si-N-O system film 14 was determined by forming a Si-N-O system film on a silicon wafer at the same time when a similar film was formed on the Co-Cr system alloy film, and by carrying out Rutherford backscattering analysis, infrared absorption spectrum measurement, and Auger electron analysis.

TABLE 1

| Example of the Invention | Composition of Protective Layer (at %) | | | Film Thickness (Å) | Durability (Number of Passes) |
| --- | --- | --- | --- | --- | --- |
| | O | N | Si | | |
| 1 | 4 | 53 | Remainder | 210 | 250 × 10$^4$ |
| 2 | 5 | 50 | Remainder | 180 | 300 × 10$^4$ |
| 3 | 10 | 45 | Remainder | 210 | 410 × 10$^4$ |
| 4 | 17 | 33 | Remainder | 190 | 350 × 10$^4$ |
| 5 | 33 | 21 | Remainder | 300 | 600 × 10$^4$ |
| 6 | 40 | 15 | Remainder | 230 | 400 × 10$^4$ |
| 7 | 45 | 10 | Remainder | 220 | 380 × 10$^4$ |
| 8 | 50 | 11 | Remainder | 250 | 400 × 10$^4$ |
| 9 | 53 | 5 | Remainder | 180 | 280 × 10$^4$ |

TABLE 2

| Comparative Examples | Protective Layer | Film Thickness (Å) | Durability (Number of Passes) |
| --- | --- | --- | --- |
| 1 | Silicon Nitride | 200 | 200 × 10$^4$ |
| 2 | Aluminum Oxide | 150 | 80 × 10$^4$ |
| 3 | Aluminum Oxide | 200 | 100 × 10$^4$ |
| 4 | Tungsten Carbide | 170 | 100 × 10$^4$ |
| 5 | Boron Nitride | 200 | 10 × 10$^4$ |
| 6 | Titanium Nitride | 150 | 8 × 10$^4$ |

As may be clear from Table 1, the protective layers of Si-N-O system films based on the present invention display a conspicuous improvement in the durability, in spite of their small thickness, compared with the films of silicon nitride, aluminum oxide, tungsten carbide, boron nitride, titanium nitride, and others in Table 2 that have been proposed as protective layers in the prior art. The improvement effect in the durability becomes the more conspicuous especially when the composition of Si, N, and O has the atomic ratios (at %) of 45 to 55% of silicon, 10 to 50% of nitrogen, and 5 to 45% of oxygen, with number of passes in excess of 3 million. Needless to say, there may be included in such a composition incidental impurities in addition to silicon, nitrogen, and oxygen.

Furthermore, in the above embodiment, it has a construction in which a Si-N-O system film 14 is formed especially on a Co-Cr system alloy film 12 so that the chrome component in the Co-Cr system alloy film 12 contributes to an improvement in the gluing of the Si-N-O system film 14, providing a satisfactory adhesion of the Si-N-O system film 14 without the intervention of an intermediate layer. Therefore, together with the previously mentioned fact that the thickness of the Si-N-O system film 14 itself may be chosen small, the effective spacing between the medium and the head can be reduced in a more efficient manner. This leads to a very small spacing loss in perpendicular magnetic recording and to an advantage that it gives rises to a satisfactory recording and reproducing characteristics.

In Table 3 is listed the value of $1/\lambda$ ($\lambda$ is the wavelength) of the infrared radiation which is absorbed most by the Si-N-O system film, for various content ratios of nitrogen N and oxygen O in the film. As is clear from the table Si-N-O system films with $1/\lambda$ in the range in excess of 830 $cm^{-1}$ and less than 1100 $cm^{-1}$ show excellent durability. In particular, by selecting the content of oxygen in the Si-N-O system film so as to make the film to show an absorption maximum of infrared radiation in the range above 850 $cm^{-1}$ and below 1050 $cm^{-1}$ of $1/\lambda$, it becomes possible to obtain a magnetic recording medium that shows an excellent durability.

TABLE 3

| Protective Layer | Film Thickness (Å) | $1/\lambda$ ($cm^{-1}$) | Durability (Number of Passes) |
|---|---|---|---|
| Examples of Invention | | | |
| 1 Si—N—O System | 200 | 835 | 250 × 10⁴ |
| 2 Si—N—O System | 180 | 850 | 300 × 10⁴ |
| 3 Si—N—O System | 230 | 920 | 500 × 10⁴ |
| 4 Si—N—O System | 250 | 970 | 450 × 10⁴ |
| 5 Si—N—O System | 180 | 1000 | 400 × 10⁴ |
| 6 Si—N—O System | 210 | 1050 | 350 × 10⁴ |
| Comparative Examples | | | |
| 1 Si—N System | 200 | 830 | 200 × 10⁴ |
| 2 Si—O System | 180 | 1100 | 200 × 10⁴ |

Figure 2:
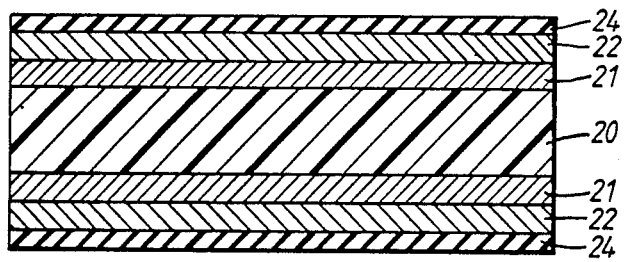
FIG. 2 illustrates the sectional view of another embodiment of the present invention.

In FIG. 2 there is shown another embodiment of the magnetic recording medium according to the present invention. On a nonmagnetic base 20, a soft ferro-magnetic layer 21 and a Co-Cr system alloy film 22 as a magnetic recording layer formed in layers by the sputtering method or the vapor deposition method, and a Si-N-O system film 24 is formed on top of it by the sputtering method as a portective layer. As the soft ferromagnetic layer 21, use is made, for example, of a permalloy film, a Co-Zr system alloy film, sendust alloy film, or the like.

For magnetic recording medium of the above construction, these can also be obtained excellent perpendicular magnetic recording characteristics and a high durability similar to the magnetic recording medium for the preceding embodiment.

Figure 3:
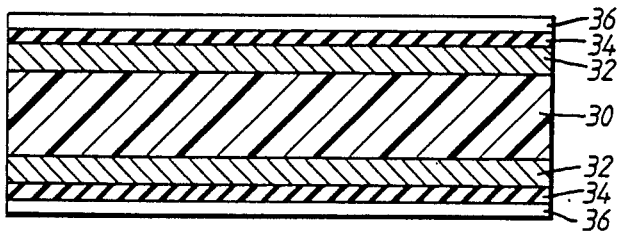
FIG. 3 illustrates the sectional view of still another embodiment of the present invention.

In FIG. 3 is shown still another embodiment of the magnetic recording medium according to the present invention. On a nonmagnetic base 30 there is formed in succession a Co-Cr system alloy film 32 and a Si-N-O system film 34, and on top of it there is formed a lubricant layer by spreading a layer of liquid lubricant for instance, of fluorocarbon system.

In the magnetic recording media of this embodiment, it is possible to obtain a superior durability than the magnetic recording media of the type shown in FIG. 1 that are obtained by forming a Si-N-O system film alone on the base. In particular, a lubricant layer 36 of flurocarbon system lubricant has excellent wetting and holding capabilities so that it is possible to spread it sufficiently thin and in uniform thickness so as not to injure the perpendicular magnetic recording characteristics. Moreover, a sufficiently strong bonding between the Si-N-O system film 34 and the lubricant layer 36 can also be secured.

In Table 4 are shown the results of investigation on the relationship that exists between the various combinations of the materials in the protective layer and the lubricant layer to be formed on the Co-Cr system alloy film, and the durability.

TABLE 4

| | Protective Layer | Thickness of Protective Layer (Å) | Lubricant Layer | Thickness of Lubricant Layer (Å) | Durability (Number of Passes) |
|---|---|---|---|---|---|
| Examples of the Invention | | | | | |
| 1 | Si—N—O System ($1/\lambda$ = 1050 $cm^{-1}$) | 200 | Fluorocarbon System | 30 | 450 × 10⁴ |
| 2 | Si—N—O System ($1/\lambda$ = 1010 $cm^{-1}$) | 190 | Fluorocarbon System | 100 | 800 × 10⁴ |
| 3 | Si—N—O System ($1/\lambda$ = 990 $cm^{-1}$) | 190 | Fluorocarbon System | 250 | 1100 × 10⁴ |
| 4 | Si—N—O System ($1/\lambda$ = 1010 $cm^{-1}$) | 210 | Butyl Stearate | 150 | 350 × 10⁴ |
| 5 | Si—N—O System ($1/\lambda$ = 1050 $cm^{-1}$) | 200 | Oleic Acid | 200 | 300 × 10⁴ |
| Comparative Examples | | | | | |
| 1 | Si—N System ($1/\lambda$ = 830 $cm^{-1}$) | 200 | Fluorocarbon System | 200 | 200 × 10⁴ |

TABLE 4-continued

| | Protective Layer | Thickness of Protective Layer (Å) | Lubricant Layer | Thickness of Lubricant Layer (Å) | Durability (Number of Passes) |
|---|---|---|---|---|---|
| 2 | Si—O System ($1/\lambda = 1100$ cm$^{-1}$) | 200 | Fluorocarbon System | 200 | $200 \times 10^4$ |
| 3 | Aluminum Oxide | 170 | Fluorocarbon System | 100 | $260 \times 10^4$ |
| 4 | Aluminum Oxide | 210 | Butyl Stearate | 150 | $14 \times 10^4$ |
| 5 | Aluminum Oxide | 200 | Oleic Acid | 180 | $7 \times 10^4$ |
| 6 | Tungster Carbide | 200 | Fluorocarbon System | 110 | $110 \times 10^4$ |
| 7 | Tungster Carbide | 220 | Butyl Stearate | 170 | $9 \times 10^4$ |
| 8 | Tungster Carbide | 230 | Oleic Acid | 150 | $5 \times 10^4$ |
| 9 | Tungster Carbide | 210 | None | — | $4 \times 10^4$ |

As may be seen clearly from Table 4, a magnetic recording medium in accordance with the present invention in which a lubricant layer, in particular, of the fluorocarbon system lubricant, is formed on a Si-N-O system film which contains a proper amount of oxygen, has a markedly improved durability in comparison to a prior art magnetic medium in which a protective layer such an aluminum oxide film or a tungsten carbide film is used, while controlling the thickness of the lubricant layer and the Si-N-O system film which acts as a protective layer to a value for a perpendicular magnetic recording.

In the preceding embodiments a Co-Cr system alloy film has been exemplified as a magnetic recording layer. However, anything other than Co-Cr system alloy film will do provided that it possesses a perpendicular axis of easy magnetization, and in fact, a metallic oxide film may also be used replacing such a metallic film. Furthermore, although in these embodiments, a magnetic recording medium which has a magnetic recording layer and a protective layer, and still more a lubricant layer, formed on both sides of the base, has been described, the present invention may also be applied to a medium with these films formed only on one side of the base.

While the present invention has been described in connection with what is presently considered to be the most practical and preferred embodiments, it is to be understood that the present invention is not to be limited to the disclosed embodiments on the contrary, is intended to cover various modifications and equivalent arrangements included within the spirit and scope of the appended claims whose scope is to be accorded the broadest interpretation so as to encompass all such modification and equivalent structures.

What is claimed is:

1. A magnetic recording medium comprising:
   a substrate;
   at least one magnetic layer having an axis of easy magnetization in a direction perpendicular to a surface thereof, formed on the substrate; and
   a film consisting essentially of silicon, nitrogen, and oxygen, formed on the magnetic layer, the amount of oxygen being selected so as to cause an absorption maximum of infrared radiation in the range of 830 cm$^{-1}$ to 1100 cm$^{-1}$ of $1/\lambda$ where $\lambda$ is the wavlength of the infrared radiation.

2. A magnetic recording medium according to claim 1 wherein said film contains oxygen in an amount to cause an absorption maximum of infrared radition in the range of 850 cm$^{-1}$ and to 1050 cm$^{-1}$ of $1/\lambda$.

3. A magnetic recording medium according to claim 1 wherein said film is amorphous.

4. A magnetic recording medium according to claim 1 wherein said magnetic layer is a Co-Cr containing alloy.

5. A magnetic recording medium according to claim 1 wherein said substrate is a flexible disk.

6. A magnetic recording medium according to claim 1 further including second magnetic and film layers formed on a second surface of said substrate.

7. A magnetic recording medium according to claim 1 further including a lubricant layer formed on said film.

8. A magnetic recording medium according to claim 7 wherein said lubricant layer comprises a fluorocarbon containing lubricant.

9. A magnetic recording medium according to claim 1 wherein said film contains in respective atomic ratio of 45 to 55% of silicon, 10 to 50% of nitrogen, and 5 to 45% of oxygen.

10. A magnetic recording medium according to claim 1 wherein the thickness of said film is between 20 Å and 500 Å.

* * * * *